United States Patent [19]
Abend et al.

[11] Patent Number: 5,782,142
[45] Date of Patent: Jul. 21, 1998

[54] AXLE DRIVING APPARATUS

[75] Inventors: Robert Abend. Morristown. Tenn.;
Hiroaki Shimizu; Norihiro Ishii. both of Amagasaki. Japan

[73] Assignees: Tuff Torq Corporation. Morristown. Tenn.; Kanzaki Kokyukoki Mfg. Co.. Hyogo. Japan

[21] Appl. No.: 631,258

[22] Filed: Apr. 12, 1996

[51] Int. Cl.$^6$ .................................. F16H 57/02
[52] U.S. Cl. ............................ 74/607; 74/606 R
[58] Field of Search .................. 74/607, 606 R; 277/37, 35, 58

[56] References Cited

U.S. PATENT DOCUMENTS

| | | |
|---|---|---|
| 1,136,363 | 4/1915 | Pepper . |
| 1,227,055 | 5/1917 | Kellogg . |
| 2,480,069 | 8/1949 | Wright . |
| 3,196,696 | 7/1965 | Ritter . |
| 3,209,538 | 10/1965 | Kuze . |
| 3,279,172 | 10/1966 | Kudo et al. . |
| 3,408,084 | 10/1968 | Huling ........................... 277/37 |
| 3,476,395 | 11/1969 | Cornelius ..................... 277/37 X |
| 3,486,335 | 12/1969 | Kern et al. . |
| 3,680,312 | 8/1972 | Forster . |
| 3,687,212 | 8/1972 | Forster . |
| 3,751,924 | 8/1973 | Brown et al. . |
| 3,802,289 | 4/1974 | Cheek . |
| 3,944,010 | 3/1976 | Winter et al. . |
| 3,975,026 | 8/1976 | Boyle et al. ................. 277/37 X |
| 4,145,883 | 3/1979 | Forster . |
| 4,449,424 | 5/1984 | Hauser . |
| 4,495,768 | 1/1985 | Valavaara . |
| 4,616,478 | 10/1986 | Jensen . |
| 4,627,237 | 12/1986 | Hutson . |
| 4,726,256 | 2/1988 | von Kaler et al. . |
| 4,781,259 | 11/1988 | Yamaoka et al. . |
| 4,843,818 | 7/1989 | Thoma et al. . |
| 4,858,936 | 8/1989 | Adams ........................... 74/607 X |
| 4,867,008 | 9/1989 | Yamaoka et al. . |
| 4,891,943 | 1/1990 | Okada . |
| 4,899,541 | 2/1990 | Okada et al. . |
| 4,903,545 | 2/1990 | Louis et al. . |
| 4,905,472 | 3/1990 | Okada . |
| 4,914,907 | 4/1990 | Okada . |
| 4,918,918 | 4/1990 | Miki et al. . |
| 4,932,209 | 6/1990 | Okada et al. . |
| 4,953,426 | 9/1990 | Johnson . |
| 4,962,675 | 10/1990 | Aoi et al. . |
| 4,979,583 | 12/1990 | Thoma et al. . |
| 4,986,073 | 1/1991 | Okada . |
| 5,010,733 | 4/1991 | Johnson . |
| 5,031,403 | 7/1991 | Okada . |
| 5,078,659 | 1/1992 | von Kaler et al. . |
| 5,090,949 | 2/1992 | Thoma et al. . |
| 5,152,538 | 10/1992 | Mims ........................... 277/35 |
| 5,156,576 | 10/1992 | Johnson . |
| 5,329,898 | 7/1994 | Nelson et al. ............... 277/37 X |
| 5,335,496 | 8/1994 | Azuma et al. . |
| 5,339,631 | 8/1994 | Ohashi . |
| 5,377,487 | 1/1995 | Azuma et al. . |
| 5,447,028 | 9/1995 | Azuma et al. . |
| 5,462,287 | 10/1995 | Hering et al. ............... 277/37 |
| 5,462,288 | 10/1995 | Hering et al. ............... 277/37 |
| 5,476,270 | 12/1995 | vom Schwemm et al. ....... 277/35 |

FOREIGN PATENT DOCUMENTS

| | | | |
|---|---|---|---|
| 2000108 | 7/1971 | Germany | ............... 277/37 |
| 6-61506 | 8/1994 | Japan . | |

*Primary Examiner*—Charles A. Marmor
*Assistant Examiner*—Mary Ann Battista
*Attorney, Agent, or Firm*—Sterne.Kessler. Goldstein & Fox P.L.L.C.

[57] ABSTRACT

An axle driving apparatus having a shaft sealing device to provide for compact and flexible packaging. The shaft sealing device includes an oil seal and a seal carrier for supporting the oil seal. The shaft sealing device can be used to provide a reliable fluid-tight seal for the axles and other shafts, thereby allowing the axles and other shafts to be located in different planes, and offset from the plane of the casing junction surface. The shaft sealing device may alternatively be configured as an integral unit that includes a shaft support.

39 Claims, 17 Drawing Sheets

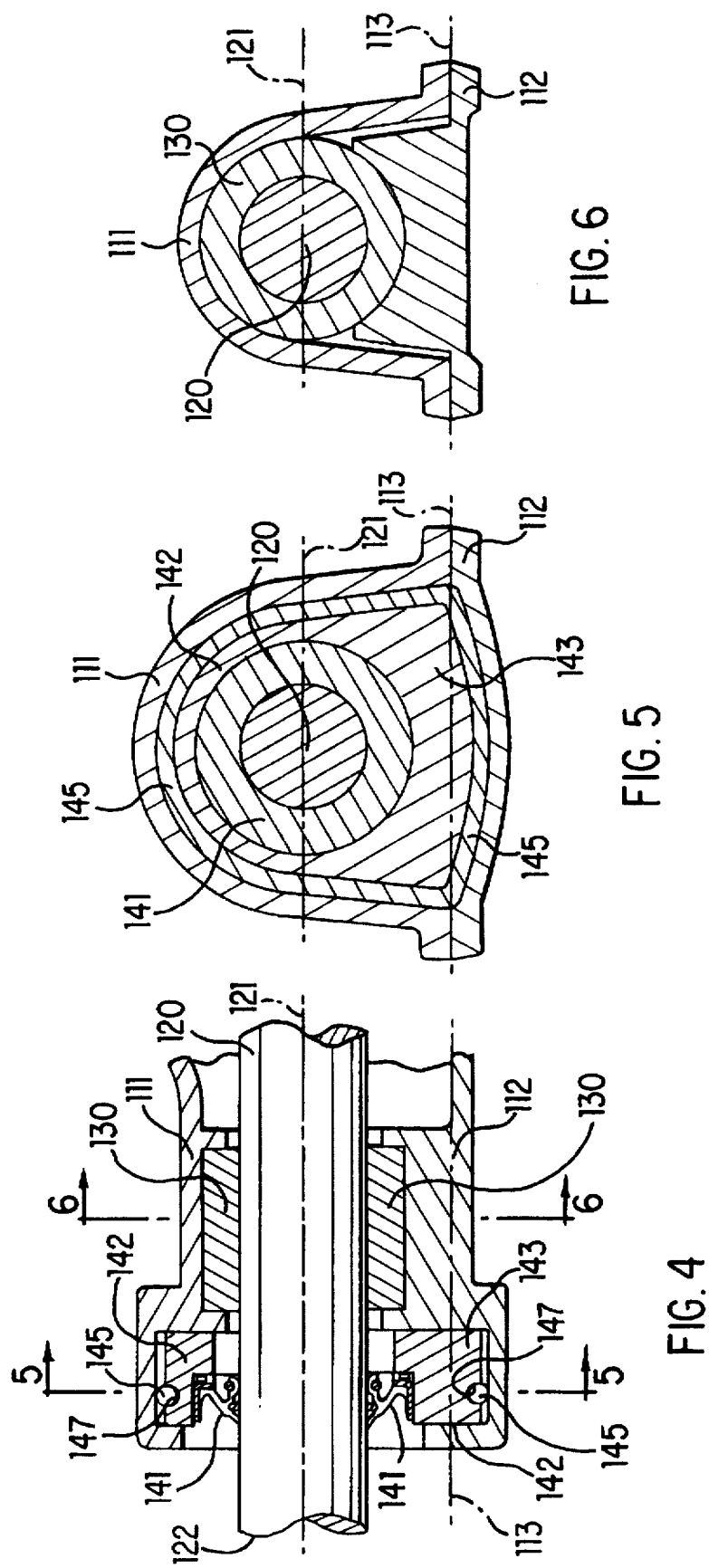

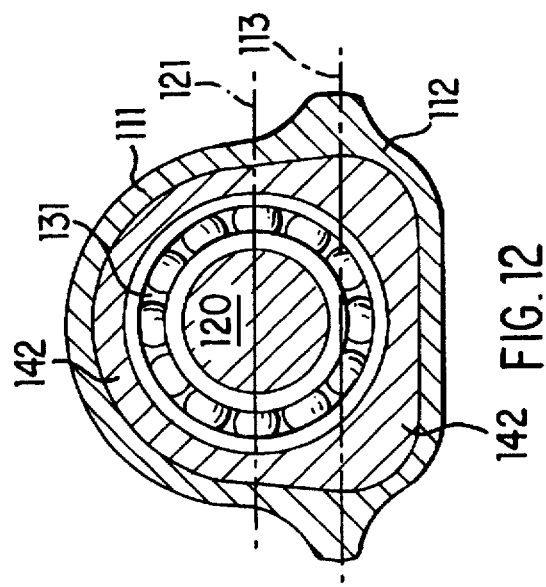
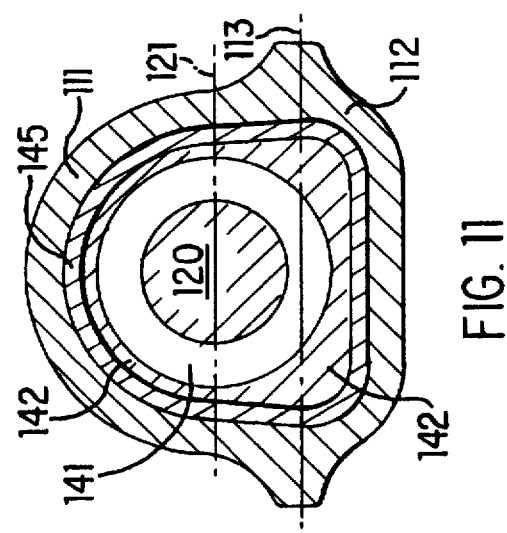
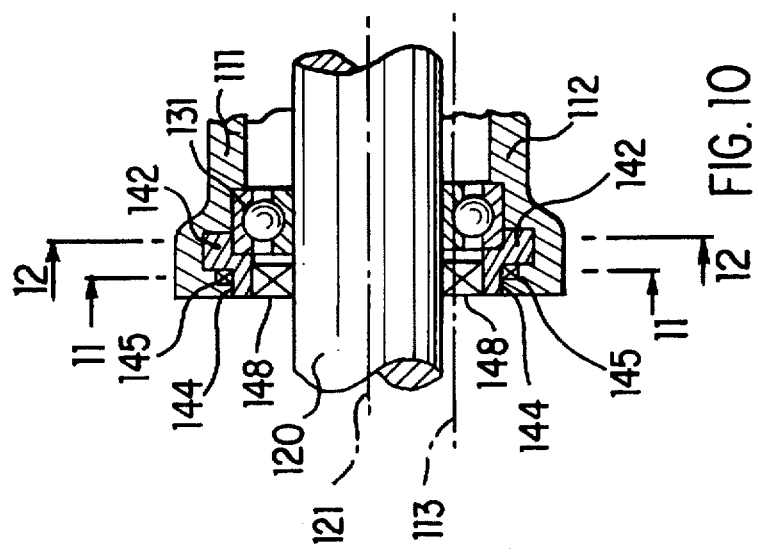

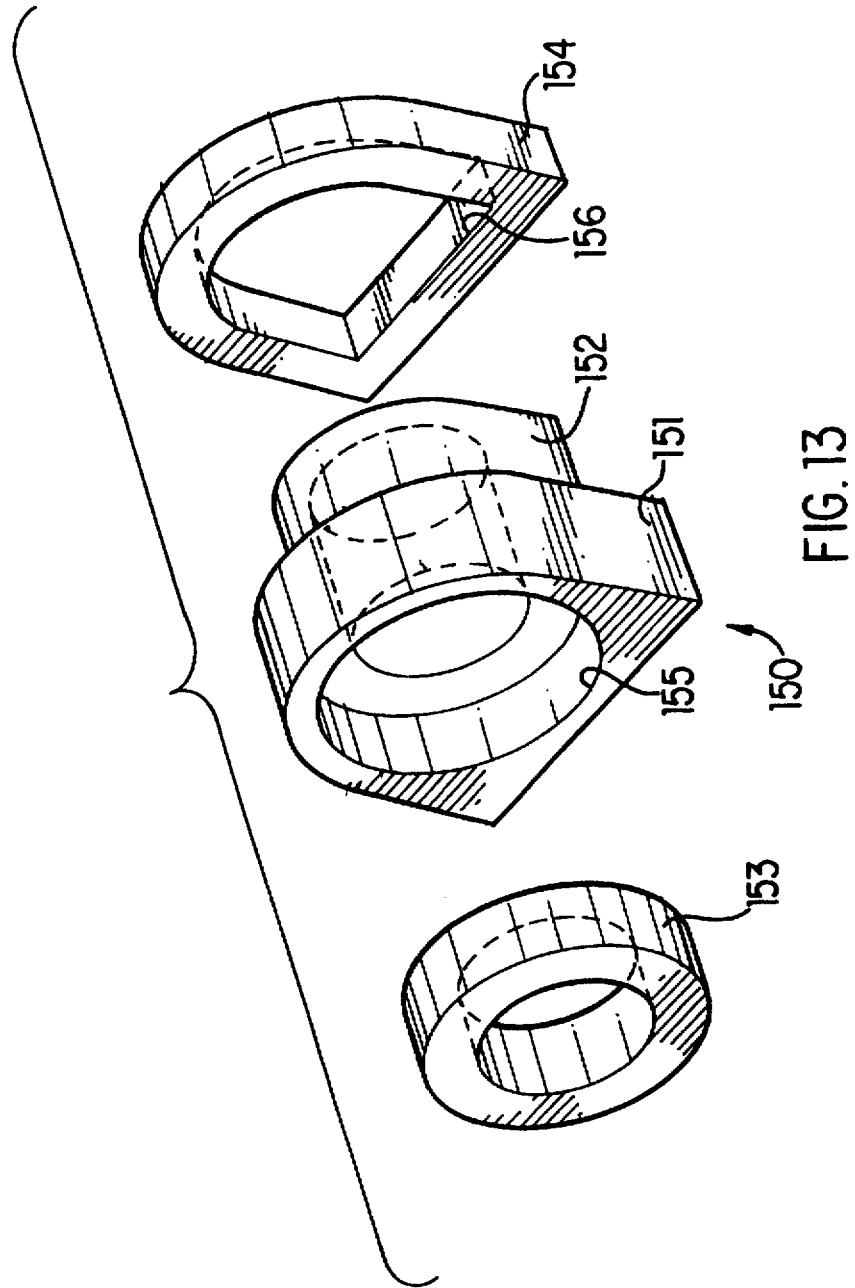

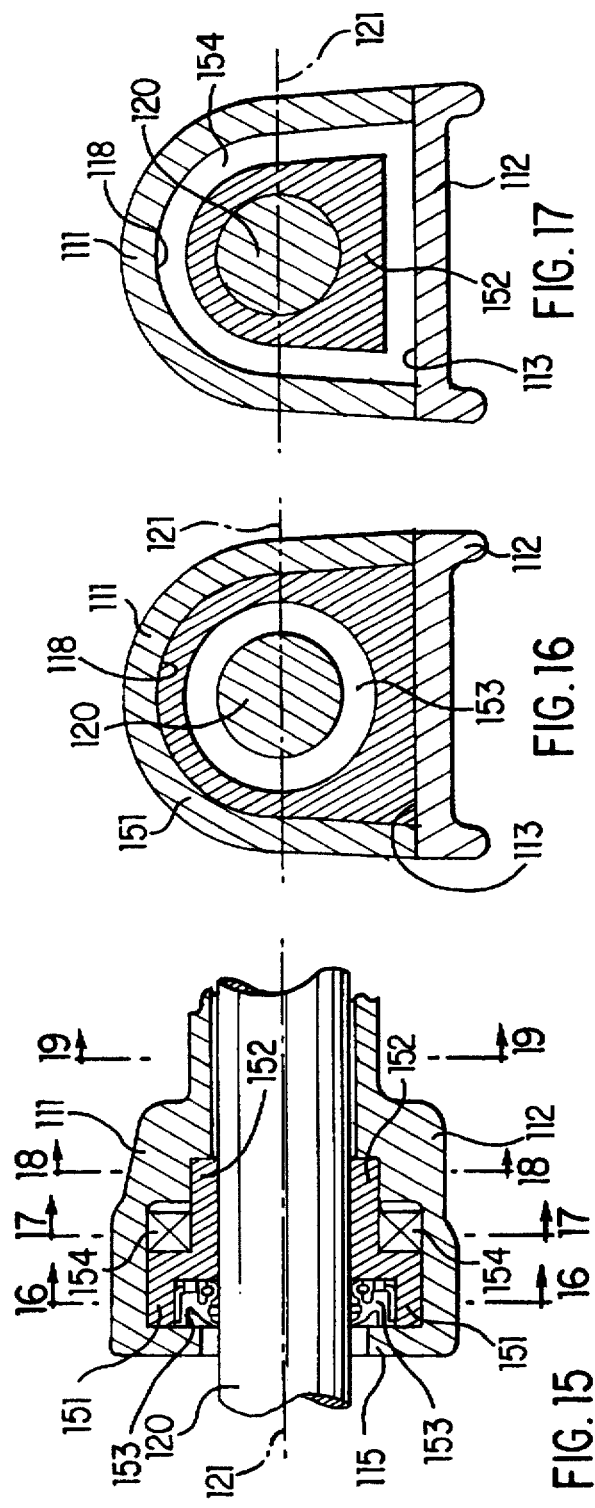

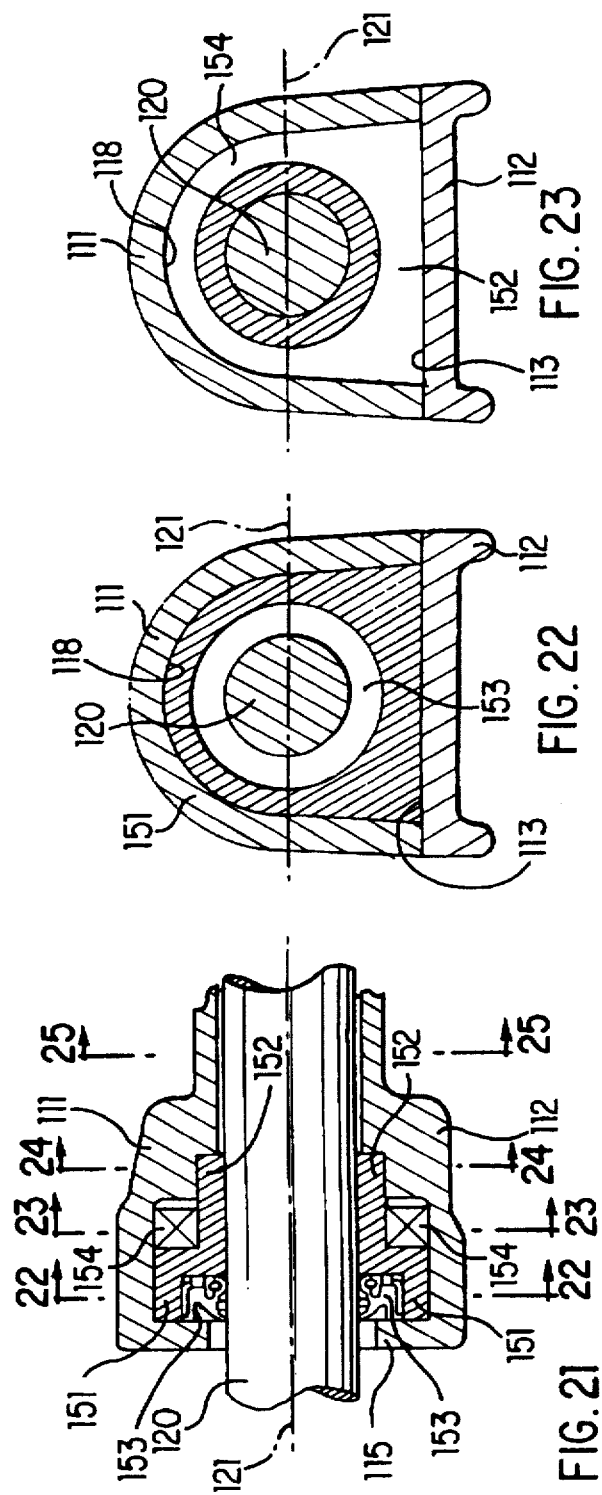

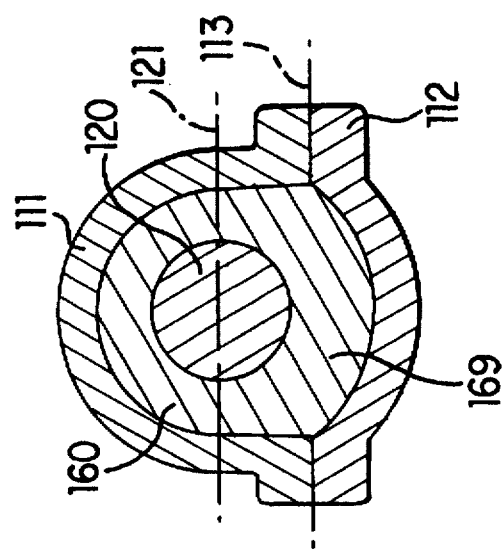
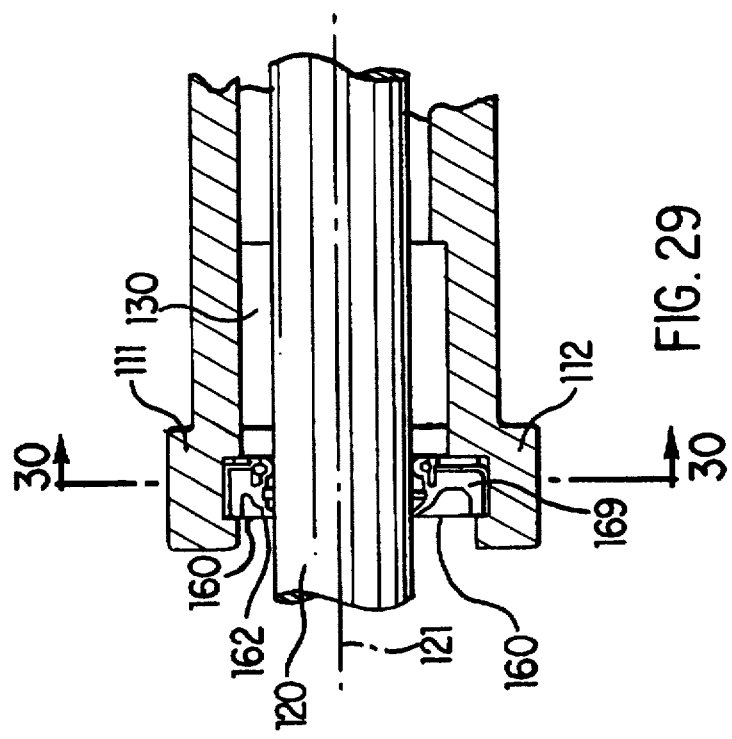

AXLE DRIVING APPARATUS

FIELD OF THE INVENTION

The present invention relates to an axle driving apparatus for a motorized vehicle. More particularly, the present invention relates to an axle driving apparatus that incorporates a shaft sealing device, resulting in a more compact and flexible packaging arrangement.

BACKGROUND OF THE INVENTION

Various configurations of an axle driving apparatus have been developed to meet specific needs. For example, an axle driving apparatus which houses a hydraulic non-stage transmission (otherwise known as a hydrostatic transmission) and axles in a common casing is disclosed in U.S. Pat. Nos. 5,090,949, 5,078,659, 4,986,073, 4,914,907, 4,932,209, 4,903,545, 5,010,733 and 4,953,426. To simplify construction, the foregoing patents describe the use of two separate casing members which are coupled along a flat surface to form a single casing. The axis of an output shaft of the hydraulic non-stage transmission, and of the axles, is contained in the plane of the coupling surface.

Such a configuration has several limitations. Having the axle shaft and the output shaft both located in the plane of the casing junction surface requires a larger casing (longer in length) than if the axle shaft and output shaft are offset vertically with respect to the casing junction surface and to each other. Additionally, if the casing is dismantled for maintenance of the transmission, then the axles must also be dismantled and removed, requiring a lengthy and complex procedure.

Finally, having the motor shaft and axle shafts in the plane of the casing junction surface requires additional means for sealing the casing to prevent oil from leaking. Operating oil used for the transmission, or lubricating oil used for the various power transmitting gears, is housed in the casing. An oil seal placed on the portion of the motor shaft or axle projecting from the casing prevents the oil from leaking from the casing. However, because the oil seal spans two casing sections, oil will leak from the casing if there is a tolerance error in manufacturing either the casing or the seal. As a result, additional means for sealing, such as liquid packing applied to the entire outer periphery of the oil seal, is necessary to prevent the oil from leaking.

To address these limitations, axle driving apparatus configurations such as those shown in U.S. Pat. Nos. 5,335,496, 5,377,487, and 5,447,028 were developed. For example, in U.S. Pat. Nos. 5,335,496 and 5,447,028, the axles are offset from the casing junction surface so that the axles remain in one casing section when the other casing section is removed, thereby simplifying assembly and disassembly for maintenance and inspection of the transmission. However, in this configuration, the transmission output shaft, and power transfer counter shaft, are still located within the plane of the casing junction surface. Japanese Utility Model Laid Open Gazette 6-61506 uses a bearing support and bearing to offset the axle from the plane of the casing junction surface.

In the configuration shown in U.S. Pat. No. 5,377,487, the axles and the transmission output shaft are both offset from the casing junction surface. However, conventional oil seals and bushings are used to seal and support the axle shafts. This requires the casting and machining of intricate recesses and projections for use with the conventional seals and bushings for the axle. The use of conventional seals and bushings results in less flexibility in locating the position of the various shafts since the location is dependent upon the ability to cast and/or machine the appropriate projections and recesses.

Configurations such as those shown in U.S. Pat. Nos. 5,335,496, 5,377,487, and 5,447,028 are also costly and time consuming to manufacture. Machining of the casing is required to seal and support non-power transfer shafts (such as a speed control shaft or a bypass control shaft). Additionally, these configurations require that the differential be assembled within the casing itself. For example, to assemble the axle driving apparatus shown in U.S. Pat. No. 5,377,487, the axle is first inserted through the opening of the bore shown at 1a in FIG. 10. Because the underside of bore 1a is closed or sealed, assembly of the differential, and other components connecting to the axle, must be done after the axle is inserted into the casing. Assembly of the differential within the casing itself complicates assembly of the overall device, and increases the time required for assembly.

Thus, there is a need in the art for an axle driving apparatus that eliminates the need for machining of the casing while allowing for the location of the various shafts to be optimized. There is also a need in the art for an axle driving apparatus that allows for significant sub-assembly of the components outside of the casing.

SUMMARY OF THE INVENTION

The axle driving apparatus with shaft sealing device of the present invention addresses the foregoing concerns. The present invention is an axle driving apparatus that includes a novel shaft sealing device. The shaft sealing device of the present invention may be used to seal one or more powered shafts in the axle driving apparatus, for example, an axle shaft, a motor shaft, or an output shaft. The shaft sealing device of the present invention may also be used to seal one or more non-powered shafts, for example, a speed control shaft or a bypass control shaft. The shaft sealing device of the present invention generally comprises a seal carrier located between the shaft and a casing, and a sealing member fixed within the seal carrier for providing a reliable fluid-tight seal around the shaft. The shaft sealing device of the present invention may be configured either separate from, or integral with, shaft supporting means.

In one aspect of the invention, the axle driving apparatus includes a casing formed from two casing sections joined along a junction surface that lies in a first plane. A transmission and an axle are located within the casing, with the longitudinal axis of the axle lying in a second plane different from the first plane of the casing junction surface. The axle driving apparatus may be configured so that the junction surface does not contain the longitudinal axis of any shaft. An axle supporting means, such as a bushing or a ball bearing, is also located within the casing. An oil seal is located around the axle to provide a reliable fluid-tight seal around the axle. A seal carrier, located between the axle and the casing, supports the oil seal.

The casing that houses the axle driving apparatus may be formed by die casting without machining. One casing section may include a cavity for the axle that has a substantially open surface facing the other casing section so that the cavity is sealed when the casing sections are joined. The transmission may include an output shaft that is sealed by the shaft sealing device of the present invention. The transmission may be a hydrostatic transmission that includes a hydraulic pump and a hydraulic motor. A control shaft, such as a speed control shaft or a bypass control shaft, may also be provided that is sealed by the shaft sealing device of the present invention.

In another aspect of the invention, the axle driving apparatus is provided with an integral seal and axle supporting device located within the casing. The integral seal and axle supporting device is configured so that the longitudinal axis of the axle lies in a plane different from the plane of the casing junction surface. The integral seal and axle supporting device may include a seal carrier for supporting a first sealing member that provides a reliable fluid-tight seal around the axle. The integral seal and axle supporting device may also include an axle support connected to the seal carrier to form an integral unit. A second sealing member may be included to provide a seal between the integral seal and axle supporting device and the casing. The integral seal and axle supporting device is preferably monolithic, and made from powdered metal.

In a further aspect of the invention, a spring-loaded sealing member is located between the axle and the casing to provide a reliable fluid-tight seal around the axle. The sealing member may include a dust lip coupled to a substantially L-shaped cup. A secondary seal may be closely disposed around the axle and a spring may be disposed around the secondary seal, the spring providing tension so that the secondary seal maintains a reliable fluid-tight seal around the axle.

Features and Advantages

A feature of the shaft sealing device of the present invention is that it can be configured either separate from, or integral with, the supporting means for the shaft. A further feature of the shaft sealing device of the present invention is that it permits sealing and supporting of control shafts without the need for machining of the axle driving apparatus casing.

The advantages of the axle driving apparatus of the present invention include its ability to be compact through the use of offset shafts, and its adaptability for use with a variety of vehicle types by optimally locating the various shafts. As such, the packaging of the axle driving apparatus can be optimized for the particular type of vehicle on which it will be used.

A further advantage of the axle driving apparatus of the present invention is its reduced cost: a non-machined casing is used that is easily assembled by sandwiching shafts, bearings, and sealing members between two casing sections; significant sub-assembly can be done outside of the casing; a smaller and more compact casing allows for more economical placement of gears; and the casing junction surface can be located in the most economical location.

BRIEF DESCRIPTION OF THE DRAWINGS

The invention will be better understood with respect to the accompanying drawings, in which:

FIG. 4 shows one embodiment of a shaft sealing device of the present invention configured as an axle sealing means;

FIG. 5 is a cross-sectional view taken along the line 5—5 in FIG. 4;

FIG. 6 is a cross-sectional view taken along the line 6—6 in FIG. 4;

FIG. 10 shows a further embodiment of a shaft sealing device of the present invention configured as an axle sealing means;

FIG. 11 is a cross-sectional view taken along the line 11—11 in FIG. 10;

FIG. 12 is a cross-sectional view taken along the line 12—12 in FIG. 10;

FIG. 13 shows a perspective view of one embodiment of an integral seal and shaft supporting device of the present invention;

FIG. 15 shows the embodiment of FIG. 13 configured as an integral seal and axle supporting device;

FIG. 16 is a cross-sectional view taken along the line 16—16 in FIG. 15;

FIG. 17 is a cross-sectional view taken along the line 17—17 in FIG. 15;

FIG. 18 is a cross-sectional view taken along the line 18—18 in FIG. 15;

FIG. 19 is a cross-sectional view taken along the line 19—19 in FIG. 15;

FIG. 21 shows the embodiment of FIG. 14 configured as an integral seal and axle supporting device;

FIG. 22 is a cross-sectional view taken along the line 22—22 in FIG. 21;

FIG. 23 is a cross-sectional view taken along the line 23—23 in FIG. 21;

FIG. 24 is a cross-sectional view taken along the line 24—24 in FIG. 21;

FIG. 25 is a cross-sectional view taken along the line 25—25 in FIG. 21;

FIG. 29 shows an alternate embodiment of a shaft sealing device of the present invention configured as an axle sealing means;

FIG. 30 is a cross-sectional view taken along the line 30—30 in FIG. 29; and

DESCRIPTION OF THE PREFERRED EMBODIMENTS

The present invention relates to an axle driving apparatus that incorporates a shaft sealing device that allows the various shafts to be easily and economically configured in a non-coplanar relationship, resulting in a more compact and flexible packaging arrangement. The shaft sealing device of the present invention may be used to seal powered shafts, for example, an axle, a motor shaft, or an output shaft. The shaft sealing device of the present invention may also be used to seal non-powered shafts, for example, a control shaft such as a speed control shaft. The shaft sealing device of the present invention generally comprises an oil seal and a seal carrier, and may be configured either separate from, or integral with, the supporting means for the shaft.

Figure 1:
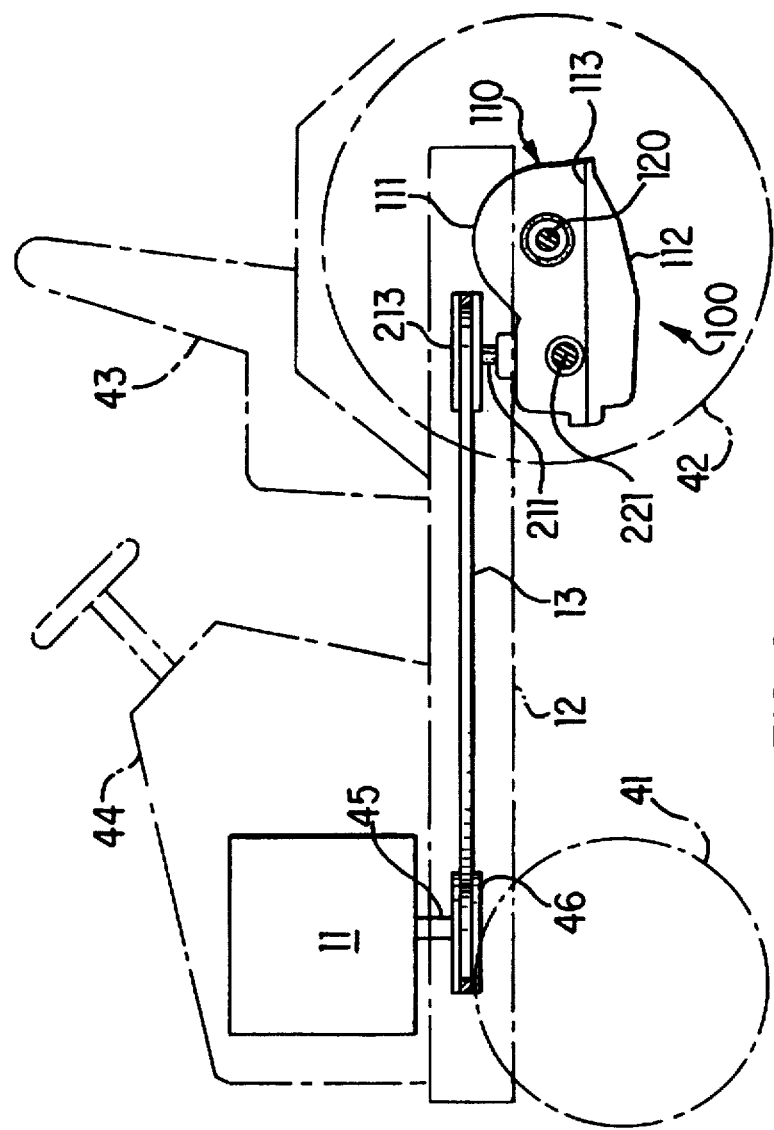
FIG. 1 shows a side view of a vehicle on which is mounted an axle driving apparatus of the present invention.
Figure 2:
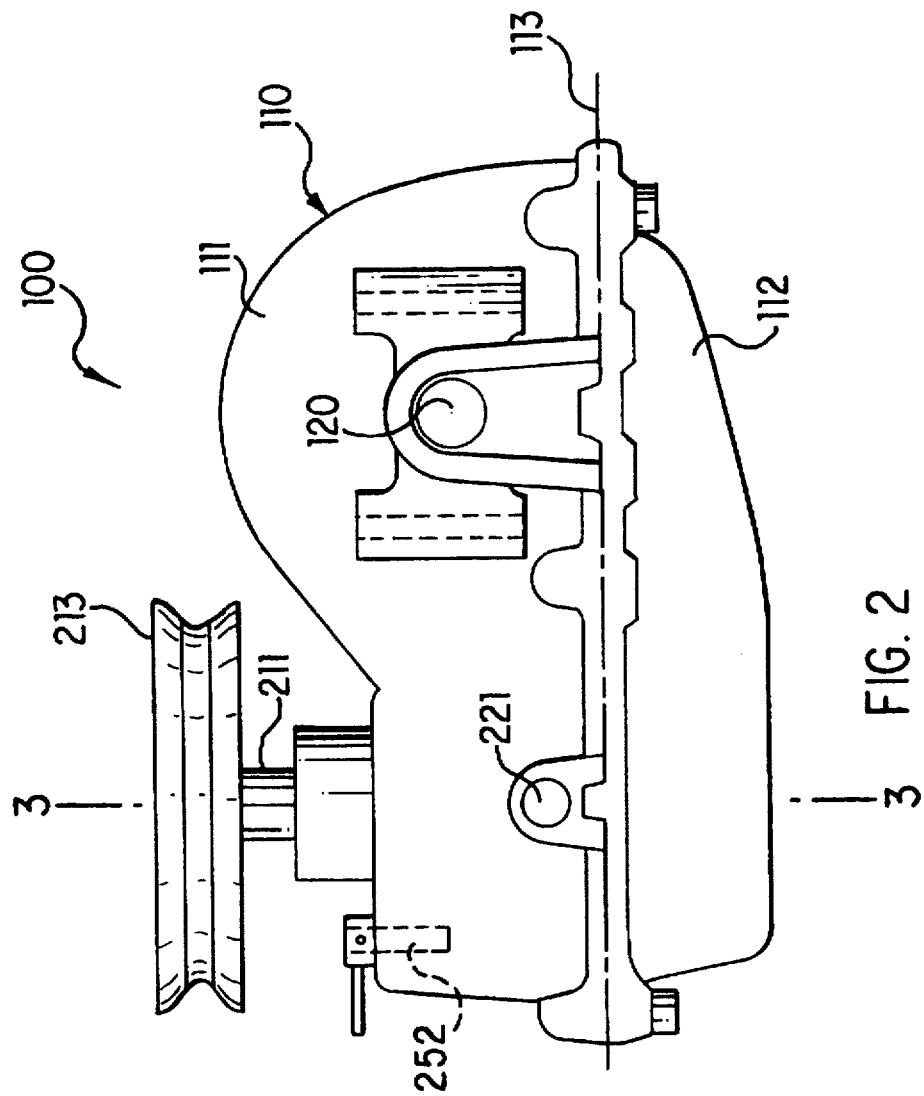
FIG. 2 shows a side view of an axle driving apparatus of the present invention.

With continuing reference to the drawing figures in which similar reference numerals are used throughout the description to describe similar features of the invention, FIG. 1 shows a side view of a vehicle on which is mounted an axle driving apparatus 100 of the present invention. An engine 11 having a vertically disposed output shaft 45 is located within a bonnet 44 of the vehicle. A pulley 46 is attached to engine output shaft 45 to transmit power from engine 11. As shown in FIGS. 1 and 2, an input pulley 213 is attached to an input shaft 211 projecting from a casing 110 of axle driving apparatus 100. A belt transmission mechanism 13 is disposed between both pulleys 46 and 213, thereby transmitting engine power to axle driving apparatus 100. Casing 110 houses a hydraulic non-stage or hydrostatic transmission 200 (best seen in FIG. 3), including input shaft 211 and output shaft 221, an axle 120, and a gear for drivingly connecting transmission 200 with axle 120. Casing 110 is filled with operating oil for transmission 200. Although a hydrostatic transmission is illustrated, other types of transmissions may be used with the present invention.

In the embodiment shown in FIG. 1, engine 11 is disposed at the front of a body frame 12. Casing 110 hangs downwardly from the rear of body frame 12 through mounting brackets (not shown). Rear driving wheels 42 (left and right) are attached to axles 120 (left and right) laterally projecting from casing 110. Front steering wheels 41, and a seat 43, are also shown in FIG. 1. In the embodiment shown in FIG. 1, engine 11 is a vertical type engine in which engine output shaft 45 is vertically disposed, with belt transmission mechanism 13 transmitting power to casing 110. Casing 110 is horizontally disposed, i.e., casing junction surface 113 is substantially horizontally disposed when axle driving apparatus 100 is attached to the vehicle. Alternatively, when engine output shaft 45 is positioned horizontally, e power transmitting shaft using a universal joint may be provided to transmit power to input shaft 211 projecting horizontally from casing 110 attached to the vehicle in a vertical manner.

As shown in FIGS. 1 and 2, casing 110 is formed by joining at least two casing sections, upper casing section 111 and lower casing section 112, along a casing junction surface 113. The axes of output shaft 221 and axle 120 are disposed within casing 110.

Figure 3:
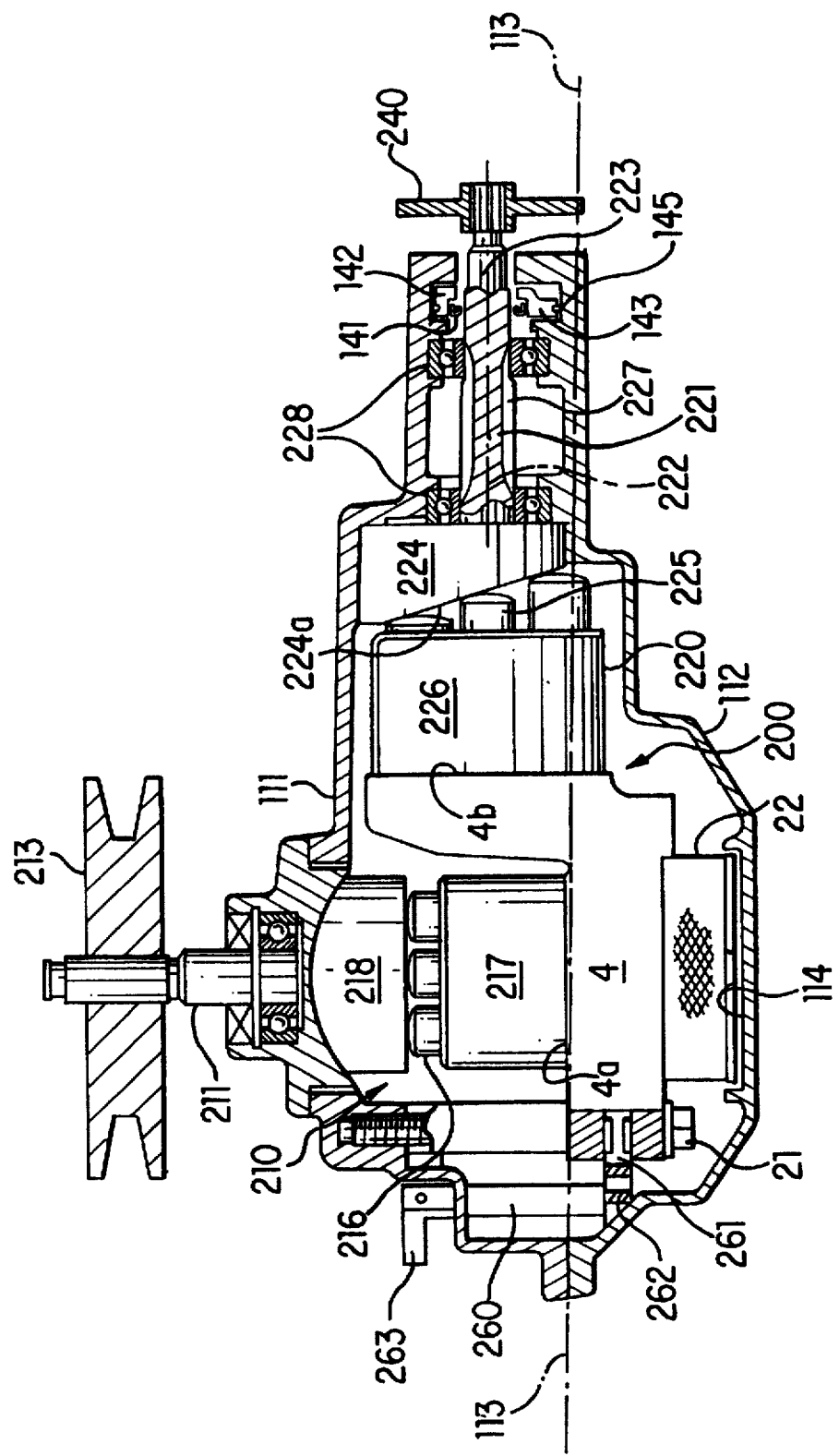
FIG. 3 is a cross-sectional view taken along the line 3—3 in FIG. 2.

With reference to FIGS. 2 and 3, transmission 200 will now be described. Transmission 200 comprises a hydraulic pump 210, a hydraulic motor 220, and a center section 4 for hydraulically coupling the pump and motor. Center section 4 is substantially L-shaped in cross-section, with a pump mounting surface 4a and a motor mounting surface 4b extending substantially perpendicularly with respect to each other. Center section 4 may be fixed within casing 110 in a variety of ways. For example, as shown in FIG. 3, center section 4 may be attached to upper casing section 111 through the use of one or more bolts 21. As shown in FIG. 3, hydraulic pump mounting surface 4a may be disposed in substantially the same plane as casing junction surface 113, with hydraulic motor mounting surface 4b substantially perpendicular to casing junction surface 113. Hydraulic pump 210 is an axial plunger piston type pump, although it is contemplated that other types of pumps are suitable for use with the present invention. Input shaft 211 is connected to input pulley 213 and belt transmission mechanism 13. A cylinder block 217 is coupled with input shaft 211 and rotatably mounted on pump mounting surface 4a. A plurality of reciprocal pistons 216 freely project therefrom. A movable swash plate 218 is in contact with a head of each piston 216 and is adapted to change its slant angle by rotation of a speed control shaft 252 (see FIG. 2) pivotally supported by upper casing section 111.

Hydraulic motor 220 is also of the axial plunger piston type, although it is contemplated that other types of motors are suitable for use with the present invention. A fixed member 224 is sandwiched between upper casing section 111 and lower casing section 112. A plurality of reciprocal pistons 225 are projectable and retractable along a slanted portion 224a of fixed member 224. A major portion of fixed member 224 may be secured to upper casing section 111, thereby enabling the thrust from pistons 225 to be reliably received by a single casing section. A cylinder block 226, for slidably receiving pistons 225, is rotatably mounted on motor mounting surface 4b. An output shaft 221 is coupled with cylinder block 226. Within center section 4 is an oil-feedside passage (not shown) forming a closed circuit for operating oil. When input shaft 211 is driven by engine 11, through belt transmission mechanism 13 and input pulley 213, the rotation of input shaft 211 sends operating oil from hydraulic pump 210 to hydraulic motor 220 through the oil-feedside passage, thereby driving output shaft 221.

As shown in FIG. 3, a recess 114 is formed in lower casing section 112 below hydraulic pump 210. Disposed within recess 114 is an oil filter 22 for purifying the operating oil stored in casing 110. After purification, the oil is taken into the supply circuit (not shown) of center section 4 as operating oil for transmission 200.

As shown in FIG. 3, transmission 200 may be configured with a bypass control feature. Center section 4 may be configured to include a pair of bypass operating valves (not shown). A horse-shoe type operating member 261 is disposed in front of the operating valves. Operating member 261 is retained to an eccentric operating shaft 262 mounted to a bypass control shaft 260 so that a bypass valve operating arm 263 is optionally rotated to move operating member 261. As the pair of bypass operating valves are depressed, they enable operating oil to be discharged from the closed circuit in center section 4 to casing 110.

As shown in FIGS. 1 through 3, output shaft 221 is offset, in parallel, to casing junction surface 113 such that the longitudinal axis 222 of output shaft 221 is not disposed within the same plane as casing junction surface 113. Cylinder block 226 is mounted onto motor mounting surface 4b so that output shaft 221 is positioned to one side of upper casing section 111. Output shaft 221 projects from upper casing section 111. A brake mechanism, such as brake disc 240, is fixed at the end of output shaft 221, thereby enabling output shaft 221 to be operated by a brake operating mechanism (not shown). The brake mechanism is disposed on a portion of output shaft 221 that extends outwardly from casing 110.

A gear 227 is knurled on output shaft 221. Bearings 228 support gear 227 at each axial end. Gear 227 is used to drivingly connect output shaft 221 with axle 120. For example, a differential having a ring gear that engages with gear 227 may be used. In such a configuration, axles 120 (left and right) are differentially coupled with each other through a bevel gear mechanism located in the ring gear. Such a configuration is shown and described in U.S. Pat. No. 5,377,487, the entirety of which is incorporated herein by reference. Alternatively, a counter shaft arrangement may be used to drivingly connect output shaft 221 with axles 120. A suitable counter shaft arrangement is shown and described in U.S. Pat. No. 5,335,496, the entirety of which is incorporated herein by reference.

Figure 7:
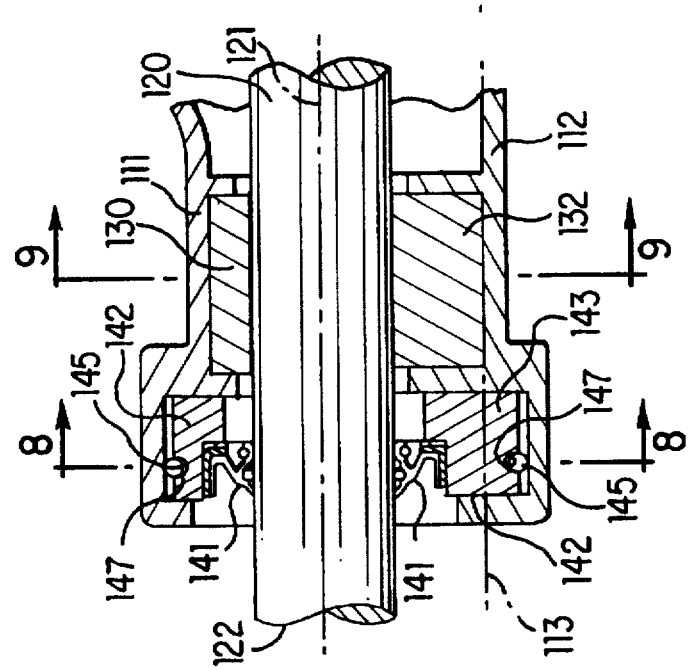
FIG. 7 shows an alternate embodiment of a shaft sealing device of the present invention configured as an axle sealing means.

Turning now to FIGS. 4–9, a shaft sealing device of the present invention configured as an axle sealing means will be described. FIGS. 4 and 7 show an end 122 of axle 120 that projects from casing sections 111 and 112. The axle sealing means of the present invention seals around the projecting end through the use of an oil seal 141 and a seal carrier 142. As shown in FIGS. 4, 5, 7, and 8, oil seal 141 is closely disposed around axle 120 to provide a reliable fluid-tight seal around axle 120, thereby preventing operating oil from leaking out of casing 110 around the axles. Oil seal 141 should be flexible enough to accommodate misalignment and radial free play, while maintaining sufficient contact to provide a reliable fluid-tight seal. Misalignment and radial free play may be generated by tolerance stack-up in the manufacturing of axle 120, seal carrier 142, casing 110, and axle supporting means 130 (discussed below).

Figure 27:
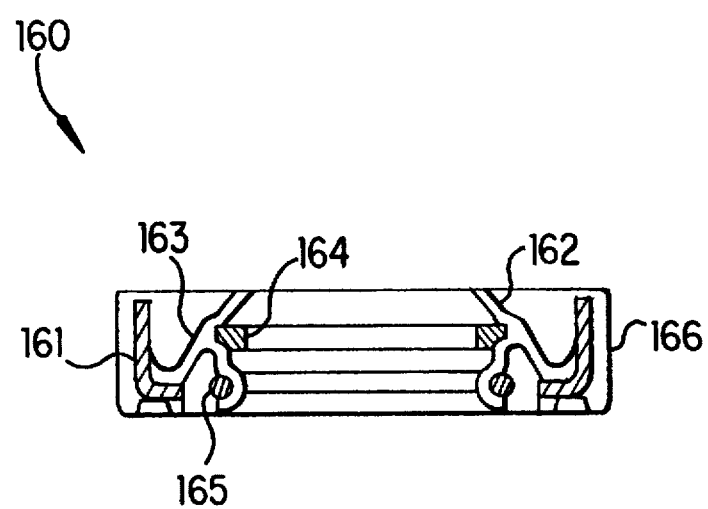
FIG. 27 shows a cross-section of a seal suitable for use in the present invention.

A particularly preferred configuration for seal 141 is shown in FIG. 27. With reference to FIG. 27, a cross-section of a seal 160 is shown. Seal 160 is housed within a nitrile outer casing 166 that contains a substantially L-shaped cup 161, preferably made from a metal such as steel. A dust lip 162 is provided to seal out dust and water, and prevent them from entering casing 110. Seal 160 is located within casing 110 so that dust lip 162 is disposed toward the outside of casing 110 (see, for example, FIG. 29). Dust lip 162 is coupled to cup 161 through a land area or sloping face 163. A secondary seal 164 is closely disposed around or surrounds axle shaft 120. Dust lip 162, land area 163, and secondary seal 164 are all preferably made from a material compatible with oil, such as nitrile rubber. A spring 165 or other type of biasing means is wrapped around secondary seal 164 to provide tension so that secondary seal 164 provides an enhanced fluid-tight seal around axle shaft 120. The rubber material of secondary seal 164 may enlarge or creep over time, resulting in oil leaking from the casing around the axle. Spring 165 provides constant tension to maintain secondary seal 164 in contact with the axle to prevent leaks of this nature.

Seal 160 accommodates misalignment and radial free play, while maintaining sufficient contact with the axle to provide a reliable fluid-tight seal. Spring 165 provides the flexibility necessary to compensate for misalignments, while also generating a biasing or tensioning force to maintain sufficient contact with the axle.

Oil seal 141 is fixed within seal carrier 142. Seal carrier 142 is provided between axle 120 and casing sections 111 and 112 to support oil seal 141 in whatever position axle 120 is located. As best seen in FIGS. 4, 5, 7, and 8, seal carrier 142 includes an extended portion 143 so that the longitudinal axis 121 of axle 120 can be located in upper casing section 111, offset in a plane different from the plane of casing junction surface 113. Alternatively, seal carrier 142 can be inverted and positioned so that longitudinal axis 121 of axle 120 is located in lower casing section 112. It is to be understood that the shape of seal carrier 142 is not limited to the shapes illustrated in the figures. For example, seal carrier 142 may be round, oval, or elliptical in shape, substantially "D" shaped, or have other shapes suitable for the particular environment in which the seal carrier is used. Seal carrier 142 is preferably made from a material that is rigid enough to hold or maintain its shape. One such material is a plastic, such as 30% glass-filled nylon. Seal carrier 142 does not physically support axle 120, and is not intended to be a load bearing device.

As best seen in FIGS. 4, 5, 7, and 8, the axle sealing means of the present invention may optionally include an O-ring 145, positioned between seal carrier 142 and casing sections 111 and 112. O-ring 145 provides a reliable fluid-tight seal between seal carrier 142 and casing sections 111 and 112. FIGS. 4 and 7 show O-ring 145 located within a recess 147 along the periphery of seal carrier 142 adjacent casing sections 111 and 112. Alternatively, O-ring 145 may be positioned in a recess formed within casing 110 itself. O-ring 145 is preferably made from a material that is compatible with oil, such as a nitrile material (e.g., nitrile rubber). The use of O-ring 145 is optional; a sealant such as a liquid silicone sealant may be used instead of an O-ring.

Figure 9:
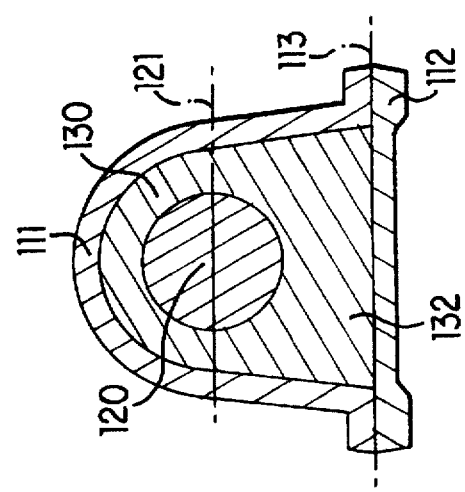
FIG. 9 is a cross-sectional view taken along the line 9—9 in FIG. 7.
Figure 8:
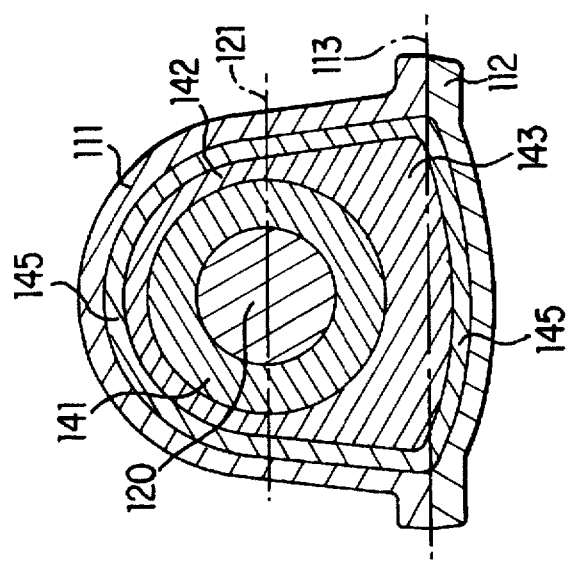
FIG. 8 is a cross-sectional view taken along the line 8—8 in FIG. 7.

Because seal carrier 142 does not physically support axle 120, axle supporting means, such as a bushing 130, is provided between axle 120 and casing sections 111 and 112, as shown in FIGS. 4, 6, 7, and 9. The periphery of bushing 130 may be configured in an annular or cylindrical shape, as shown in FIGS. 4 and 6. Alternatively, bushing 130 may be configured to include an extended portion 132 below axle 120, as shown in FIGS. 7 and 9. Preferably, bushing 130 is made from a powdered metal, such as steel or bronze. Alternatively, bushing 130 may be machined from bronze or other bearing-type material.

Turning now to FIGS. 10–12, an alternative axle supporting means is shown. FIGS. 10 and 12 show a ball bearing 131 for supporting axle 120. Alternatively, a needle bearing (not shown) may be used to support axle 120. An oil seal 148 and seal carrier 142 are used to provide a reliable fluid-tight seal around axle 120. Oil seal 148 may be a generic or conventional type of oil seal. In this embodiment, O-ring 145 is disposed on a ledge 144 of seal carrier 142 (see FIG. 10).

The shaft sealing device of the present invention can be configured as a shaft sealing means to seal other types of shafts that are exposed or project from casing 110. For example, the shaft sealing device of the present invention can be used to provide a reliable fluid-tight seal around output shaft 221 as shown in FIG. 3. Oil seal 141, seal carrier 142, and O-ring 145 are shown as sealing an end 223 of output shaft 221 that projects from casing 110. As shown in FIG. 3, extended portion 143 is provided to accommodate the position of the longitudinal axis 222 of output shaft 221 as offset from casing junction surface 113. As best seen in FIG. 2, the longitudinal axis of output shaft 221 lies in a plane different from the plane of the longitudinal axis of axle 120, and different from the plane of junction surface 113.

The shaft sealing device of the present invention can also be used to seal a control shaft. By control shaft is meant a shaft that is not driven, or one that does not transfer power, such as bypass control shaft 260 (see FIG. 3) or speed control shaft 252 (see FIG. 2) discussed above. In a manner similar to that shown in FIG. 3 for output shaft 221, oil seal 141 and seal carrier 142 can be used to provide a reliable fluid-tight seal around a control shaft, such as bypass control shaft 260 or speed control shaft 252.

In the embodiments of the shaft sealing device of the present invention shown in FIGS. 4–12, the shaft sealing device is independent of and separate from the supporting means for the sealed shaft. For example, as shown in FIGS. 4–9, axle 120 is physically supported by bushing 130 that is separate from seal carrier 142. Similarly, in FIGS. 10–12, axle 120 is physically supported by ball bearing 131 that is separate from seal carrier 142. In a further embodiment of the present invention, a shaft supporting means and a seal carrier are provided in a single integral unit to form an integral seal and shaft supporting device.

Figure 14:
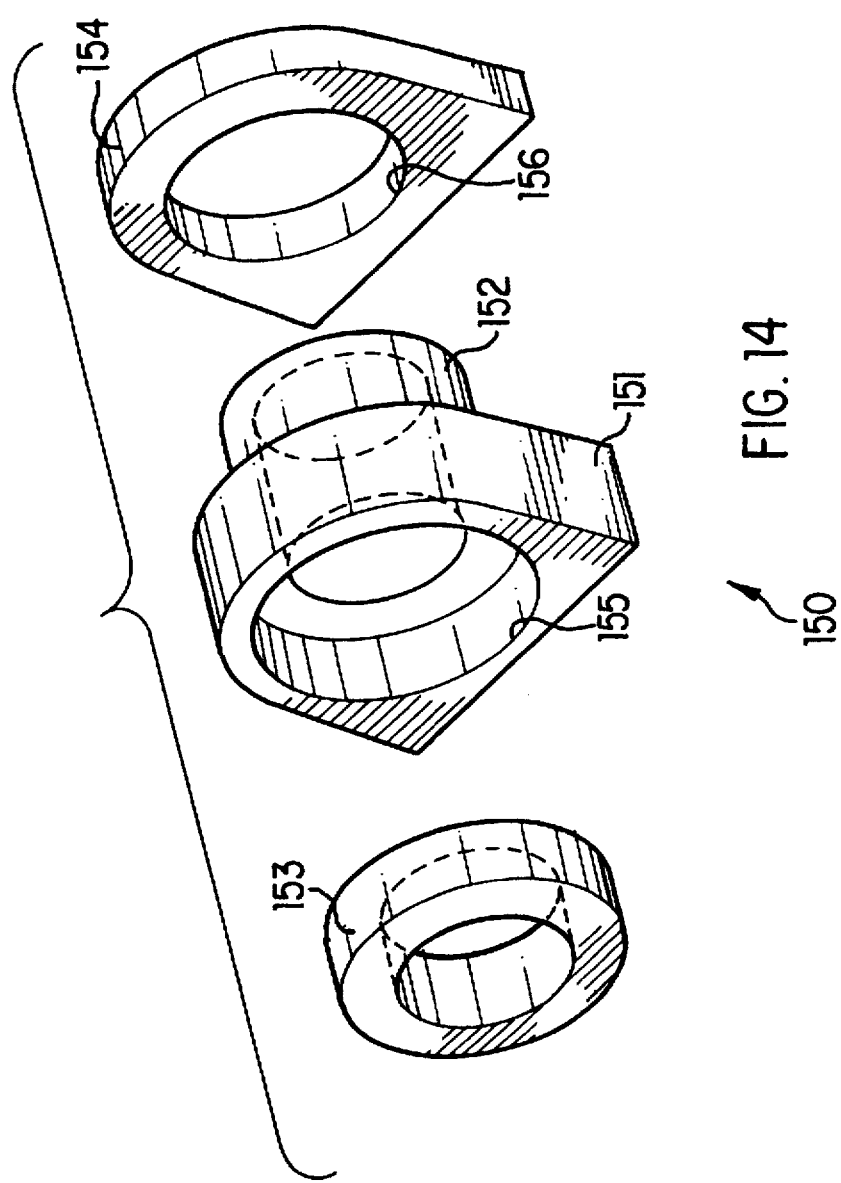
FIG. 14 shows a perspective view of an alternate embodiment of an integral seal and shaft supporting device of the present invention.

FIGS. 13 and 14 each show an embodiment of an integral seal and shaft supporting device 150 of the present invention. As shown in FIG. 13, a seal carrier 151 is connected to a shaft support 152 to form integral device 150. Seal carrier 151 is substantially "D" shaped (having the shape of a "D" with one substantially flat or shallowly curved side coupled to a curved or arched portion). Shaft support 152 is also substantially "D" shaped. Seal carrier 151 defines a recess 155 in which is received a seal 153 for providing a reliable fluid-tight seal around a shaft (not shown). Seal 153 in FIG. 13 has an annular or cylindrical shape. However, seals having other shapes can also be used. A particularly preferred configuration for seal 153 is shown in FIG. 27.

A second seal 154 is used to provide a seal around the periphery of shaft support 152. Seal 154 is preferably made from a material such as rubber. Seal 154 defines an opening 156 that is configured or shaped to receive shaft support 152. As shown in FIG. 13, the inner periphery of opening 156 is substantially "D" shaped to correspond to or fit shaft support 152. Alternatively, second seal 154 may be configured so that it is disposed around the outside or outer periphery of seal carrier 151, thereby providing a reliable fluid-tight seal between integral device 150 and casing 110.

Figure 20:
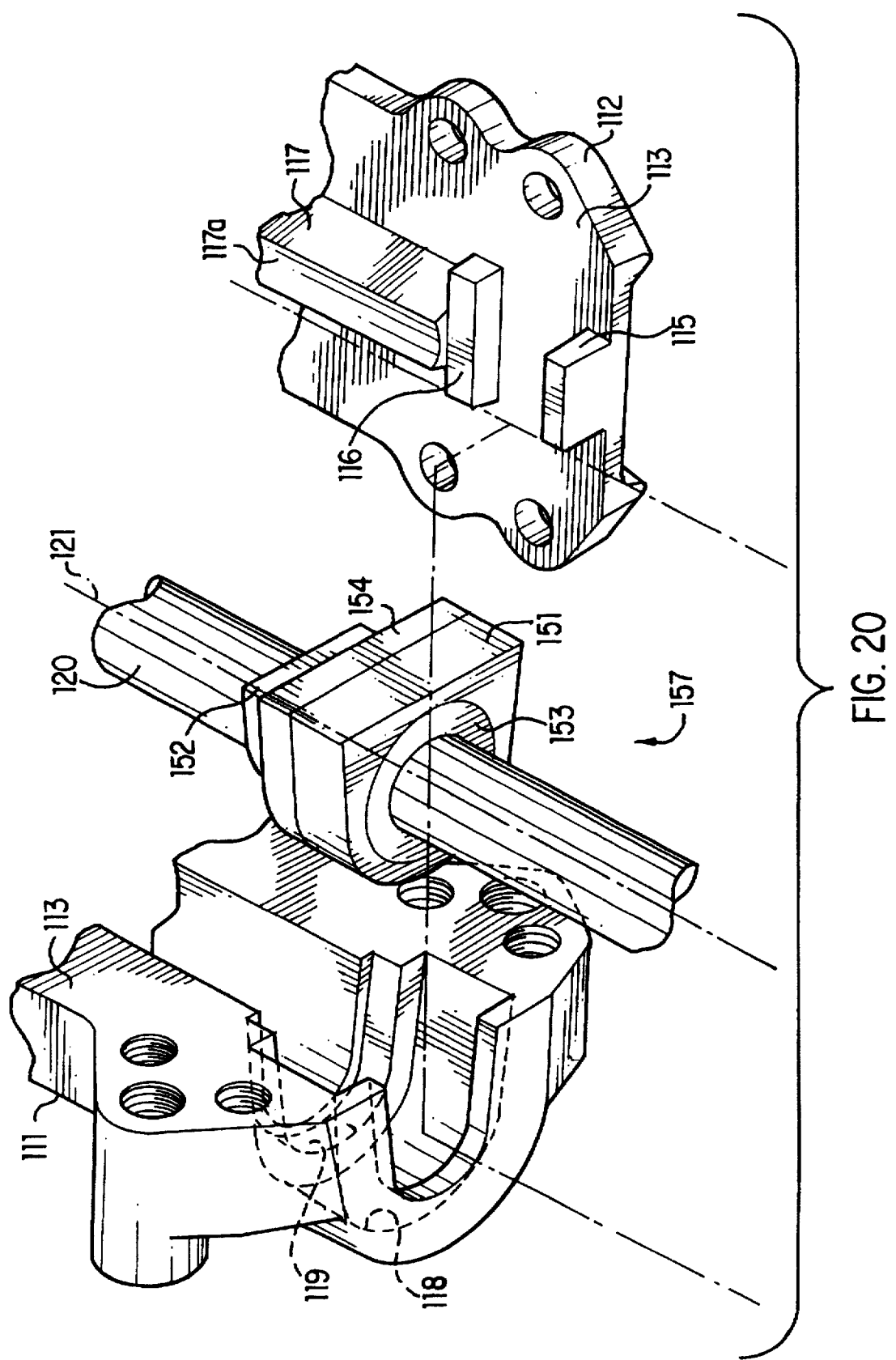
FIG. 20 shows a casing configuration for the integral seal and axle supporting device of FIG. 15.
Figure 26:
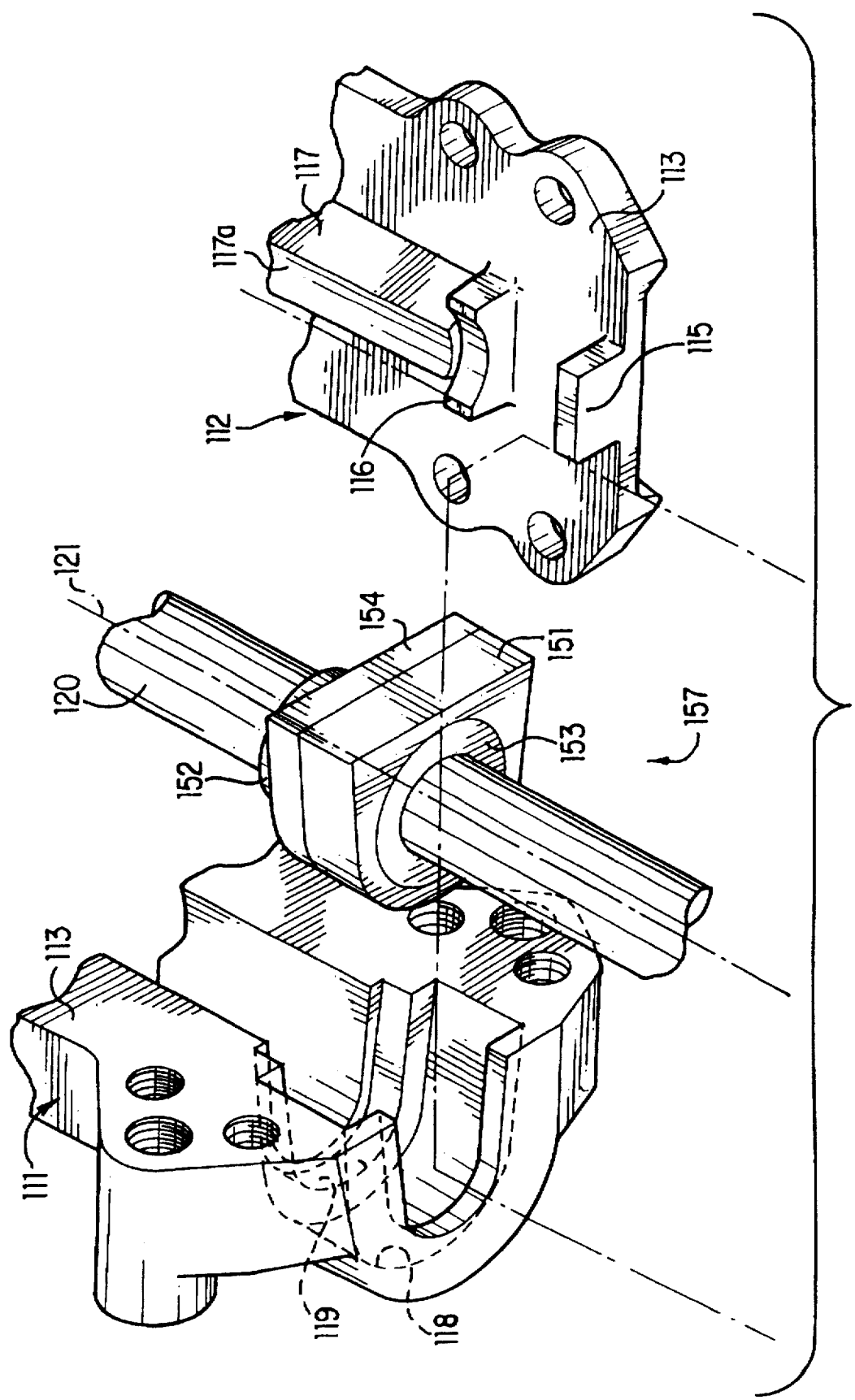
FIG. 26 shows a casing configuration for the integral seal and axle supporting device of FIG. 21.

To use integral device 150 to seal and support a shaft, seal 153 is inserted in recess 155. Shaft support 152 is mated with seal 154 by inserting it in opening 156. A shaft is inserted through the assembled device to form a subassembly, such as subassembly 157 in FIGS. 20 and 26, illustrating an axle inserted in an assembled seal and axle supporting device.

An alternate embodiment of integral device 150 is shown in FIG. 14. In this embodiment, shaft support 152 is cylindrically shaped. Likewise, opening 156 in seal 154 is substantially round-shaped for receiving shaft support 152.

Integral seal and shaft supporting device 150 is preferably monolithic (made from a single material). In a particularly preferred embodiment, seal carrier 151 and shaft support 152 are formed from powdered metal into an integral unit using an injection and compression molding process readily apparent to one of skill in the relevant art.

FIGS. 15-19 show the embodiment of integral device 150 of FIG. 13 configured as an integral seal and axle supporting device. Seal 153 is closely disposed around axle 120 to provide a reliable fluid-tight seal. As shown in FIGS. 15 and 16, seal 153 is fixed within seal carrier 151. Shaft support 152 is configured as an axle support, and is connected to seal carrier 151 to form an integral unit. As best seen in FIGS. 15 and 17, seal 154 is provided to reliably seal between shaft support 152 and casing sections 111 and 112.

A casing configuration for the integral seal and axle supporting device of FIGS. 15-19 is shown in FIG. 20. Lower casing section 112 includes a projection having a support surface 116 for axle support 152. Support surface 116 is substantially flat to correspond to the substantially flat side of "D" shaped axle support 152. Lower casing section 112 further includes a projection 115 for retaining seal 153 within seal carrier 151. A projection 117 is formed on the internal bottom surface of lower casing section 112 below axle 120, and projects along longitudinal axis 121 of axle 120. As best seen in FIG. 19, axle 120 is disposed adjacent to, but does not make contact with, an upper curved surface 117a of projection 117. The clearance between axle 120 and surface 117a ensures that operating oil flows into the cavity housing axle 120 (such as axle cavity or recess 311 shown in FIGS. 28a and 28b), to displace the air so that it can be evacuated during the manufacturing process. This minimizes any trapped air which could leak into the hydrostatic or other type of transmission. Trapped air is also minimized through the use of projection 117 which reduces the volume of air that must be displaced and evacuated. The use of projection 117 also reduces the quantity or volume of operating oil that is used. Upper casing section 111 includes a curved or arched support surface 118 that corresponds to the curved or arched portion of "D" shaped seal carrier 151 and seal 154, and a curved or arched support surface 119 that corresponds to the curved or arched portion of "D" shaped axle support 152.

FIG. 20 shows the embodiment of integral device 150 of FIG. 13 in an assembled state. With reference to FIG. 20, seal 153 is inserted in seal carrier 151, which is mated with seal 154, with axle 120 inserted therethrough to form subassembly 157. Subassembly 157 is mated with upper casing section 111 and lower casing section 112, with the casing sections joined along junction surface 113.

FIGS. 21-25 show the embodiment of integral device 150 of FIG. 14 configured as an integral seal and axle supporting device. The embodiment shown in FIGS. 21-25 is substantially the same as that shown in FIGS. 15-19, and only the differences will be addressed. The embodiment shown in FIGS. 21-25 differs from that shown in FIGS. 15-19 in the shape of axle support 152. As best seen in FIGS. 21 and 23, axle support 152 is cylindrically shaped in this embodiment.

A casing configuration for the integral seal and axle supporting device of FIGS. 21-25 is shown in FIG. 26. The embodiment shown in FIG. 26 is substantially the same as that shown in FIG. 20, and only the differences will be addressed. The embodiment shown in FIG. 26 differs from that shown in FIG. 20 in the shape of support surface 116 for axle support 152. In the embodiment of FIG. 26, support surface 116 is curved to correspond to the cylindrical shape of axle support 152.

Figure 28A:
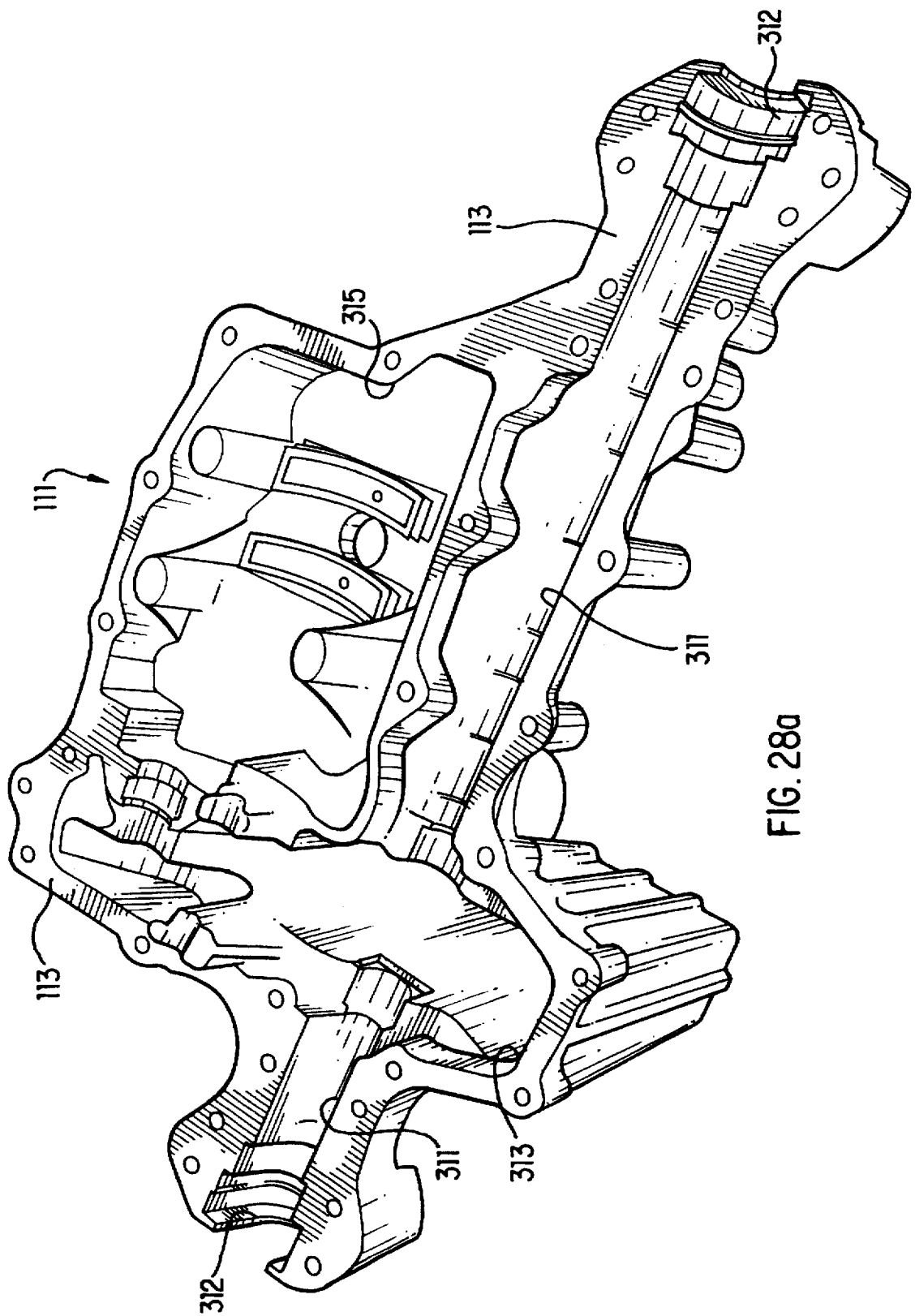
FIG. 28a shows a perspective view of a preferred embodiment for an upper casing section.
Figure 28B:
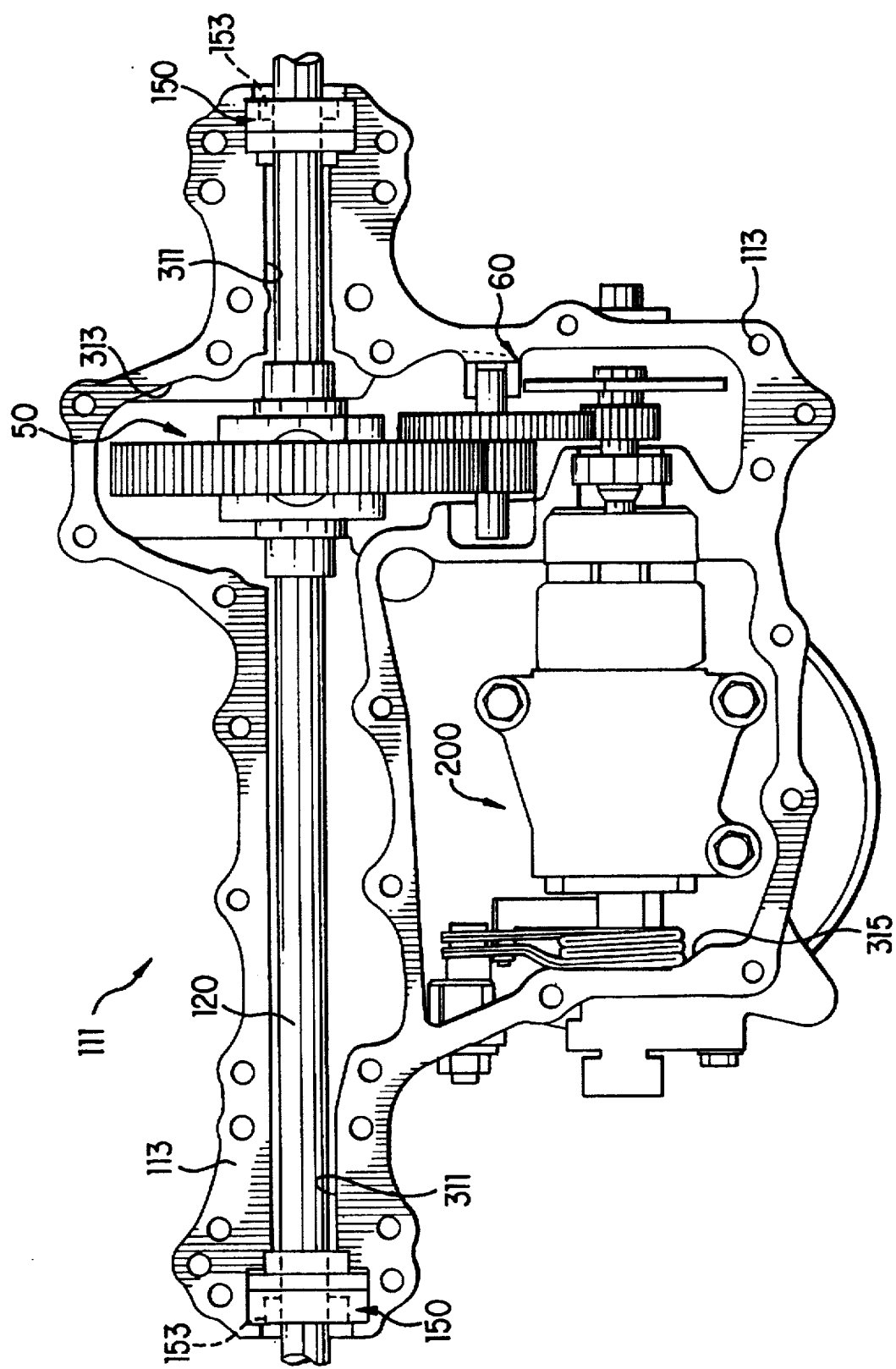
FIG. 28b shows the upper casing section of FIG. 28a with the lower casing section removed.

A particularly preferred configuration for upper casing section 111 is shown in FIGS. 28a and 28b. As shown in FIGS. 28a and 28b, upper casing section 111 includes a cavity or recess 313 in which a differential 50 and associated gearing 60 is disposed in a fully assembled axle driving apparatus. A cavity or recess 315 is provided in which the hydrostatic or other type of transmission 200 is disposed in the assembled apparatus. Axle 120 is disposed in an axle cavity or recess 311 that has an open surface that faces lower casing section 112 (not shown). When upper casing section 111 as shown in FIGS. 28a and 28b is joined with lower casing section 112 along casing junction surface 113, axle cavity 311 is sealed. A support surface 312 is provided for a seal carrier and axle support, such as integral device 150.

Upper casing section 111 as illustrated in FIGS. 28a and 28b is particularly advantageous for simplifying manufacture and assembly of the device. With the configuration shown in FIGS. 28a and 28b for one of the casing sections, the differential, axles, and axle sealing means can all be sub-assembled outside of the casing. Because axle cavity 311 has an open surface, the differential and axle sub-assembly can then be mounted within the casing. This eliminates the need to assemble the differential after the axle has been mounted within the casing, thereby simplifying and reducing the cost of manufacture.

An alternate embodiment of a shaft sealing device of the present invention configured as an axle sealing means is shown in FIGS. 29 and 30. In this embodiment, seal 160 is disposed between axle 120 and casing 110. Seal 160 is in contact with axle 120 and upper casing section 111 and lower casing section 112 to provide a reliable fluid-tight seal around axle 120. Seal 160 prevents operating oil from leaking out of the casing, and prevents dust and water from entering the casing. In this embodiment, seal 160 includes an extended portion 169 so that longitudinal axis 121 of axle 120 is disposed above casing junction surface 113. Seal 160 is discussed in detail above with respect to FIG. 27.

In the embodiment of FIGS. 29 and 30, support for axle 120 is provided by axle supporting means, such as bushing 130. Alternatively, ball bearing 131 shown in FIG. 12 may be used to support axle 120 in this embodiment. A needle bearing (not shown) may also be used to support axle 120 in this embodiment.

The embodiment shown in FIGS. 29 and 30 is particularly advantageous because only one element, seal 160, is required to provide a reliable fluid-tight seal around axle 120. With this embodiment, seal carrier 142 and O-ring 145 are not required. However, a separate support for axle 120, such as bushing 130, is needed.

The shaft sealing device of the present invention, configured either separate from, or integral with, shaft supporting means, allows the casing junction surface of the axle driving apparatus casing to be positioned in the most economical location, without regard to the position of the axles, output shaft, or control shafts. Maximum flexibility in packaging is achieved because the casing junction surface and the various shafts can be positioned in the most economical location, without necessitating machining of the casing. With the shaft sealing device of the present invention, the axle driving apparatus can be configured so that the casing junction surface does not contain the longitudinal axis of any shaft. Consequently, the axle driving apparatus as a whole will be smaller, and shorter in length because the various shafts can be offset vertically with respect to the casing junction surface, and offset with respect to each other, in a non-coplanar relationship.

Figure 31:
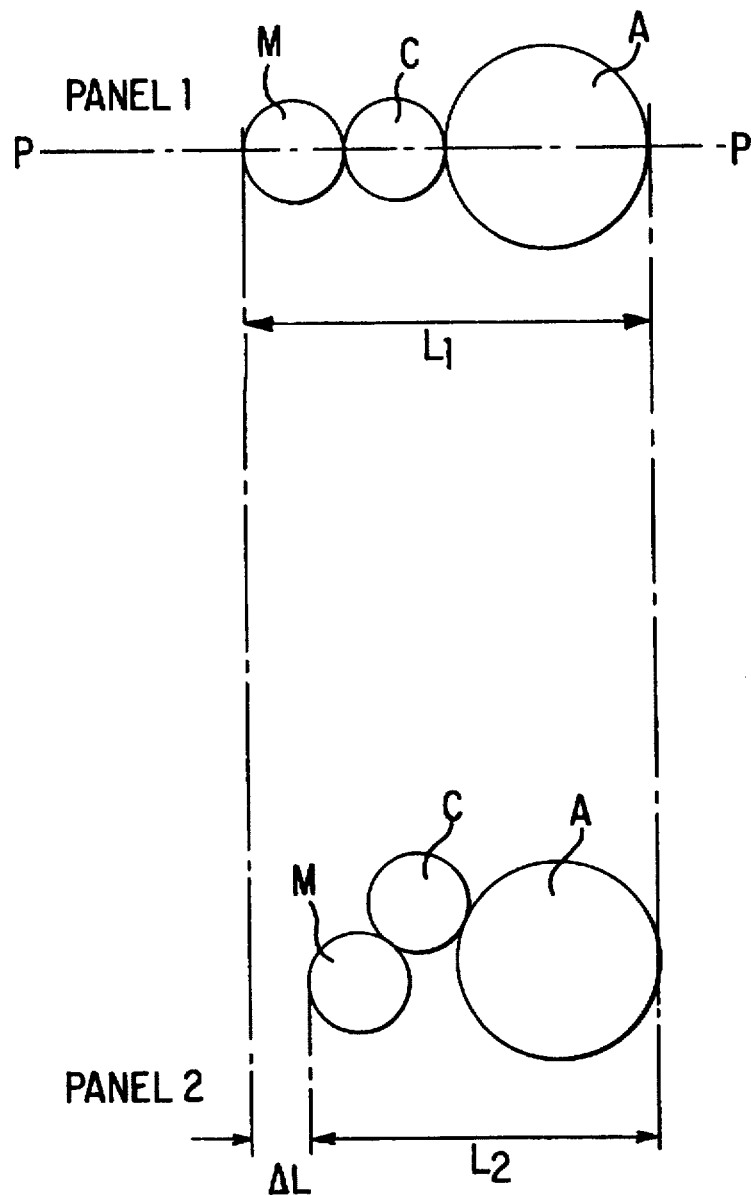
FIG. 31 shows how the use of non-coplanar shafts in accordance with the present invention reduces the length and overall package size of an axle driving apparatus.

FIG. 31 shows how the use of non-coplanar shafts in accordance with the present invention reduces the length and overall package size of an axle driving apparatus. In Panel I of FIG. 31, a motor shaft M, a counter shaft C, and an axle shaft A of an axle driving apparatus are shown in a co-planar relationship, i.e., the longitudinal axis of each shaft lies within the plane defined by the line P-P. The overall length of such an axle driving apparatus is shown by the length $L_1$. In Panel II, motor shaft M, counter shaft C, and axle shaft A are shown in a non-coplanar relationship, i.e., the longitudinal axis of each shaft lies in a different plane. The overall length of such an axle driving apparatus is shown by the length $L_2$. As can be seen from FIG. 31, $L_2$ is less than $L_1$ by an amount $\Delta L$. Thus, an axle driving apparatus that incorporates the shaft sealing device of the present invention that enables the shafts to be configured in a non-coplanar relationship has decreased length, and an overall smaller package size.

The shaft sealing device of the present invention allows the casing of the axle driving apparatus to be formed by die casting without machining, even when sealing and supporting a control shaft. Finally, significant sub-assembly of the axle driving apparatus of the present invention can be done outside of the casing. For example, the differential, the axles, and the axle sealing means can all be sub-assembled outside of the casing, and then mounted within the casing. This simplifies and reduces the cost for manufacture and maintenance of the axle driving apparatus.

While various embodiments of the present invention have been described above, it should be understood that they have been presented by way of example only, and not limitation. For example, although the axle driving apparatus of the present invention has been described as having a hydrostatic transmission, this is only one example of a suitable transmission for use with the present invention. Alternatively, the axle driving apparatus of the present invention can use a mechanical non-stage transmission, a mechanical transmission requiring step-wise speed change, or a speed reduction mechanism. Additionally, the shaft sealing device of the present invention can be used in other applications or devices where it is desired to seal a shaft.

The shapes shown herein of the various components of the shaft sealing device of the present invention have been presented by way of example only. It is to be understood that other shapes for the components are possible, and can be selected by one of skill in the art based upon the particular application. Thus the breadth and scope of the present invention should not be limited by any of the above-described exemplary embodiments, but should be defined only in accordance with the following claims and their equivalents.

What is claimed is:

1. An axle driving apparatus, comprising:

first and second casing sections joined along a junction surface to form a casing, wherein the junction surface of said first and said second casing sections lies in a first plane;

a transmission housed within said casing;

an axle having a longitudinal axis disposed within one of said first and second casing sections and having a longitudinal axis which lies in a second plane different from said first plane;

an axle supporting means disposed within said one of said casing sections in which said axle is disposed;

a seal carrier disposed between said axle and said casing;

means for supporting said axle supporting means projecting from one of said first and second casing sections which is opposite to the casing section in which said axle is disposed, to support said axle supporting means; and an oil seal disposed around said axle and fixed within said seal carrier, said oil seal configured to provide a fluid-tight seal around said axle.

2. An axle driving apparatus according to claim 1, wherein said casing is formed by die casting without machining.

3. An axle driving apparatus according to claim 1, wherein said axle supporting means comprises a ball bearing.

4. An axle driving apparatus according to claim 1, wherein said axle supporting means comprises a bushing.

5. An axle driving apparatus according to claim 1, wherein said seal carrier comprises an extended portion from said axle supporting means.

6. An axle driving apparatus according to claim 1, wherein said transmission comprises:

an output shaft having a longitudinal axis disposed within said casing through which power is transmitted out of said transmission, wherein the longitudinal axis of said output shaft lies in a third plane different from said first plane;

a second seal carrier, said second seal carrier disposed between said output shaft and said casing; and a second oil seal, said second oil seal disposed around said output shaft and fixed within said second seal carrier, said second oil seal configured to provide a fluid-tight seal around said output shaft.

7. An axle driving apparatus according to claim 6, further comprising:
a brake mechanism disposed on a portion of said output shaft that extends outwardly from said casing.

8. An axle driving apparatus according to claim 1, further comprising:
a control shaft disposed within said casing;
a second seal carrier, said second seal carrier disposed between said control shaft and said casing; and
a second oil seal, said second oil seal disposed around said control shaft and fixed within said second seal carrier, said second oil seal configured to provide a fluid-tight seal around said control shaft.

9. An axle driving apparatus according to claim 8, wherein said control shaft is a speed control shaft.

10. An axle driving apparatus according to claim 8, wherein said control shaft is a bypass control shaft.

11. An axle driving apparatus according to claim 8, wherein said first plane is different from the plane in which the longitudinal axis of said axle, the longitudinal axis of said control shaft, and the longitudinal axis of any other shaft within said casing lie.

12. An axle driving apparatus according to claim 1, wherein said transmission is a hydrostatic transmission that comprises a hydraulic pump and a hydraulic motor.

13. An axle driving apparatus according to claim 1, wherein one of said casing sections defines a cavity for receiving therein said axle, wherein said cavity has an open surface facing the other of said casing sections, wherein said cavity is sealed by joining said casing sections along the junction surface.

14. An axle driving apparatus according to claim 1, wherein said oil seal comprises biasing means for providing an enhanced fluid-tight seal around said axle.

15. An axle driving apparatus, comprising:
first and second casing sections joined along a junction surface to form a casing, wherein the junction surface of said first and said second casing sections lies in a first plane;
an axle disposed within one of said first and second casing sections and having a longitudinal axis which lies in a second plane different from said first plane;
a transmission housed within said casing;
a seal supporting device and axle supporting device which are integral with each other and which are disposed within said casing between said axle and said casing.

16. An axle driving apparatus according to claim 15, wherein said integral seal supporting device and axle supporting device comprises:
a seal carrier; and
an axle support, said axle support connected to said seal carrier to form an integral unit.

17. An axle driving apparatus according to claim 16, further comprising:
a first sealing member for providing a fluid-tight seal around said axle, said seal carrier defining a recess for receiving therein said first sealing member; and
a second sealing member defining an opening, an inner periphery of said opening configured to fit said axle support.

18. An axle driving apparatus according to claim 17, wherein said axle support is cylindrically shaped.

19. An axle driving apparatus according to claim 17, wherein said axle support is substantially D-shaped.

20. An axle driving apparatus according to claim 17, wherein said seal carrier is substantially D-shaped.

21. An axle driving apparatus according to claim 17, wherein said first sealing member comprises biasing means for providing an enhanced fluid-tight seal around said axle.

22. An axle driving apparatus according to claim 16, further comprising:
a first sealing member for providing a fluid-tight seal around said axle, said seal carrier defining a recess for receiving therein said first sealing member; and
a second sealing member for providing a fluid-tight seal between said integral seal supporting device and axle supporting device said casing.

23. An axle driving apparatus according to claim 15, wherein said integral seal supporting device and axle supporting device is monolithic.

24. An axle driving apparatus according to claim 23, wherein said integral seal supporting device and axle supporting device is formed from powdered metal.

25. An axle driving apparatus according to claim 15, wherein said first plane is different from the plane in which the longitudinal axis of said axle, and the longitudinal axis of any other shaft within said casing lie.

26. An axle driving apparatus according to claim 15, wherein one of said casing sections defines a cavity for receiving therein said axle, wherein said cavity has an open surface facing the other of said casing sections, wherein said cavity is sealed by joining said casing sections along the junction surface.

27. An axle driving apparatus according to claim 15, wherein said transmission is a hydrostatic transmission that comprises a hydraulic pump and a hydraulic motor.

28. An axle driving apparatus, comprising:
first and second casing sections joined along a junction surface to form a casing, wherein the junction surface of said first and second casing sections lies in a first plane;
a transmission housed within said casing;
an axle disposed within one of said first and second casing sections and having a longitudinal axis which lies in a second plane different from said first plane and wherein said one of said first and second casing sections in which said axle is disposed is open with respect to the other casing section along the substantial length of the portion of said casing section in which said axle is disposed;
axle supporting means disposed within said casing for supporting said axle, and
a sealing member disposed between said first and second casing sections at said junction surface, said sealing member providing a fluid-tight seal around said axle.

29. An axle driving apparatus according to claim 28, wherein said sealing member comprises:
a substantially L-shaped cup;
a dust lip coupled to said cup;
a secondary seal closely disposed around said axle; and
biasing means disposed around said secondary seal, said biasing means providing tension so that said secondary seal maintains a fluid-tight seal around said axle.

30. An axle driving apparatus according to claim 28, wherein said axle supporting means comprises a ball bearing.

31. An axle driving apparatus according to claim 28, wherein said axle supporting means comprises a bushing.

32. An axle driving apparatus according to claim 28, wherein said transmission is a hydrostatic transmission that comprises a hydraulic pump and a hydraulic motor.

33. An axle driving apparatus according to claim 28, wherein one of said casing sections defines a cavity for receiving therein said axle, wherein said cavity has an open surface facing the other of said casing sections, wherein said cavity is sealed by joining said casing sections along the junction surface.

34. An axle driving apparatus according to claim 28, wherein said axle supporting means comprises a portion for attaching said sealing member.

35. An axle driving apparatus, comprising:

first and second casing sections joined along a junction surface to form a casing, wherein the junction surface of said first and said second casing sections lies in a first plane;

a transmission housed within said casing;

an axle disposed within said casing and having a longitudinal axis which lies in a second plane different from said first plane;

an axle supporting means disposed within said casing between said axle and said casing;

an oil seal for providing a fluid-tight seal around said axle; and a seal carrier housing said oil seal, said seal carrier disposed between said first and second casing sections along said junction surface.

36. An axle driving apparatus according to claim 35, wherein said casing is formed by die casting without machining.

37. An axle driving apparatus according to claim 35, wherein said axle supporting means comprises a ball bearing.

38. An axle driving apparatus according to claim 35, wherein said axle supporting means comprises a bushing.

39. An axle driving apparatus according to claim 38, wherein said seal carrier is formed integrally with said bushing.

* * * * *